(12) United States Patent
Zhao et al.

(10) Patent No.: US 9,107,154 B2
(45) Date of Patent: Aug. 11, 2015

(54) INFORMATION NOTIFICATION AND TIMING ADVANCE ACQUISITION METHOD, SYSTEM, AND DEVICE

(75) Inventors: Yali Zhao, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 176 days.

(21) Appl. No.: 13/883,256

(22) PCT Filed: Nov. 3, 2011

(86) PCT No.: PCT/CN2011/081725
§ 371 (c)(1),
(2), (4) Date: May 31, 2013

(87) PCT Pub. No.: WO2012/059059
PCT Pub. Date: May 10, 2012

(65) Prior Publication Data
US 2013/0235858 A1    Sep. 12, 2013

(30) Foreign Application Priority Data

Nov. 3, 2010    (CN) .......................... 2010 1 0531334

(51) Int. Cl.
*H04J 3/00*    (2006.01)
*H04W 56/00*    (2009.01)
(52) U.S. Cl.
CPC .......... *H04W 56/00* (2013.01); *H04W 56/0045* (2013.01)
(58) Field of Classification Search
None
See application file for complete search history.

(56) References Cited

U.S. PATENT DOCUMENTS

| 6,633,559 | B1 | 10/2003 | Asokan et al. | |
| 2013/0034085 | A1* | 2/2013 | Bostrom et al. | ............. 370/336 |

FOREIGN PATENT DOCUMENTS

| CN | 101442359 | 5/2009 |
| CN | 101646234 | 2/2010 |

OTHER PUBLICATIONS

International Search Report for PCT/CN2011/081725 dated Feb. 16, 2012.
"Impact analysis of multiple TA," 3GPP TSG RAN WG2 #69, San Francisco, USA, Feb. 22-26, 2010, R2-101091.
"CA support for multi-TA," 3GPP TSG-RAN2 #69, San Francisco, USA, Feb. 22-26, 2010, R2-101567.

* cited by examiner

*Primary Examiner* — Afshawn Towfighi
(74) *Attorney, Agent, or Firm* — Foley & Lardner LLP

(57) ABSTRACT

Embodiments of the invention disclose an information notification and timing advance acquisition method, system and device, relate to the field of wireless communications and address the problem of how a UE acquires a Timing Advance (TA) for uplink transmission in a cell newly added in a set of cells configured for the UE. In the invention, a base station sends mapping relationships between cell and Timing Advance, TA, group to a UE, and the UE determines a TA group corresponding to a newly added cell configured for the UE by the base station according to the mapping relationships; determines whether there is a cell, having established uplink synchronization with the based station, in the TA group; and if so, then the UE regards a TA of the cell as a TA for uplink transmission in the newly added cell; otherwise, the UE acquires a TA for uplink transmission in the newly added cell by initiating a random access procedure. Apparently with the invention, the UE can acquire a TA for uplink transmission in the newly added cell.

20 Claims, 5 Drawing Sheets

INFORMATION NOTIFICATION AND TIMING ADVANCE ACQUISITION METHOD, SYSTEM, AND DEVICE

The present application is a US National Stage of International Application No. PCT/CN2011/081725, filed 3 Nov. 2011, designating the United States, and claiming priority to Chinese Patent Application No. 201010531334.3, filed Nov. 3, 2010. The contents of the foregoing applications are hereby incorporated herein by reference in their entireties.

FIELD OF THE INVENTION

The present invention relates to the field of wireless communications and particularly to an information notification and timing advance acquisition method, system and device.

BACKGROUND OF THE INVENTION

Significantly improved peak rates of 1 Gbps in the downlink and 500 Mbps in the uplink are required for a Long Term Evolution-Advanced (LTE-A) system as compared to a Long Term Evolution (LTE) system. Also good compatibility of the LTE-A system with the LTE system is required. Carrier Aggregation (CA) is introduced to the LTE-A system to accommodate the requirement on improved peak rates, compatibility with the LTE system and full use of spectrum resources.

Carrier aggregation refers to a mechanism in which a User Equipment (UE) can aggregate a plurality of cells concurrently and the plurality of cells can provide the UE concurrently with a data transmission service. In the system with carrier aggregation, component carriers corresponding to the respective cells may be consecutive or inconsecutive in the frequency domain, the maximum bandwidth of each component carrier is 20 MHz for compatibility with the LTE system, and there is a bandwidth which may be the same or different across the respective component carriers.

A random access in the LTE system happens generally for the following several reasons:

In a first scenario, there is an access to the system from a Radio Resource Control Idle (RRC_IDLE) status (also referred to an initial access);

In a second scenario, a Radio Resource Control (RRC) connection reestablishment is initiated after a radio link fails (also deemed as an initial access);

In a third scenario, a random access is required during a handover;

In a fourth scenario, a UE in a Radio Resource Control Connected (RRC_CONNECTED) status has downlink data arrival; and In a fifth scenario, a UE in an RRC_CONNECTED status has uplink data arrival.

In the third and fourth scenarios, if there is a dedicated preamble, then a contention-free random access can be performed, and FIG. 1 illustrates a contention-free random access procedure which generally includes the following three steps:

For a message 0 (Msg0): a base station assigns a UE with a dedicated random access preamble (Random Access Preamble, ra-PreambleIndex) for a contention-free random access and the mask index of a Physical Random Access Channel (PRACH) (ra-PRACH-MaskIndex) for the random access. For a contention-free random access due to incoming downlink data, such information is carried over a Physical Downlink Control Channel (PDCCH), and for a contention-free random access due to a handover, such information is carried in a handover command;

For a message 1 (Msg1): the UE sends the specified dedicated preamble to the base station over the specified PRACH resource according to the ra-PreambleIndex and the ra-PRACH-MaskIndex indicated by the Msg0. The base station calculates an uplink Timing Advance (TA) from the Msg1 upon reception of the Msg1; and For a Message 2 (Msg2): the base station sends a random access response including information on the timing advance to the UE to notify the UE of the timing advance for uplink transmission until acquisition of a next TA command.

A contention-based random access can be adopted for a random access due to any of the other random access reasons, and FIG. 2 illustrates a contention-based random access procedure which generally includes the following four steps:

For a message 1 (Msg1): a UE selects a random access preamble and a PRACH resource and sends the selected random access preamble to a base station over the PRACH resource;

For a message 2 (Msg2): the base station receives the preamble, calculates a TA and sends to the UE a random access response including at least information on the timing advance and uplink scheduling signaling (UL grant) for a message 3 (Msg3);

For the message 3 (Msg3): the UE performs uplink transmission over a resource specified by the UL grant in the Msg2, and contents of the uplink transmission vary from one random access reason to another, for example, an RRC connection establishment request is sent in the Msg3 for an initial access; and For a message 4 (Msg4): the base station sends a contention resolution message to the UE, and the UE can judge from the Msg4 whether the random access succeeds.

An uplink synchronization procedure is for the purpose of keeping the UE and the base station in uplink synchronization so that the UE sends uplink data and sends feedback information of a Hybrid Automatic Repeat Request (HARM) for downlink data.

Uplink synchronization is maintained by the base station as stipulated in the LTE system. For a random access of the UE, the base station acquires the initial timing advance from the preamble, and a subsequent uplink synchronization maintenance procedure is as illustrated in FIG. 3:

The base station and the UE maintain an uplink synchronization timer (TA Timer or TAT) respectively; the base station sends a TA command (TA cmd) to the UE and starts the TAT; if the UE can not receive the TA command correctly, then it sends a Negative Acknowledgement (NACK) message to the base station, and the base station receives the NACK, resends a TA command in an appropriate sub-frame and restarts the TAT; or if the UE receives the TA command correctly, then it starts the TAT of the UE and sends an Acknowledgement (ACK) message to the base station, and the base station restarts the TAT of the base station upon reception of the ACK message sent from the UE. The base station considers a specific UE as being synchronized if its TAT for the UE does not expire; and the UE also considers itself as being synchronized as long as the TAT maintained by the UE itself does not expire.

Two scenarios in support of multi-TA are currently defined in the 3$^{rd}$ Generation Partnership Project (3GPP).

The first scenario is a scenario in which a Remote Radio Head (RRH) is introduced.

As illustrated in FIG. 4, a large coverage area is provided at a frequency F1 (i.e., an F1 cell), a remote head is used at a frequency F2 for hotspot coverage in the F1 cell (i.e., an F2 cell), and mobility management is performed based upon the F1. In this scenario, if a UE is located in an area where the F2 RRH cell and the F1 cell overlap, then the F1 cell and the F2 cell can be aggregated, but there are different uplink TAs (UL TAs) for the F1 cell and the F2 cell.

The second scenario is a scenario in which a repeater is introduced.

As illustrated in FIG. 5, a base station supports the F1 with a large coverage area and the F2 with a small coverage area, and the coverage area of the F2 can be extended by a frequency selective repeater. In this scenario, if a UE is located in an area where the F1 cell and the F2 cell overlap, then the F1 cell and the F2 cell can be aggregated, but there are different UL TAs for the F1 cell and the F2 cell.

In order to facilitate maintenance of the TAs in the multi-TA system, the concept of TA group is introduced, and the same TA can be used for Uplink Component Carriers (UL CCs) of cells belonging to the same TA group, and different TAs can be used for UL CCs of cells belonging to different TA groups.

The inventors have identified during making of the invention the following technical problem in the prior art:

In the system with carrier aggregation, the UE performs uplink transmission in different cells possibly with the use of different TAs, but there has been absent so far a specific solution for how the UE acquires a TA for uplink transmission in a newly configured cell.

SUMMARY OF THE INVENTION

Embodiments of the invention provide an information notification method, an information notification device and a base station so as to address the problem of impossibility for a UE to acquire TA group information.

An information notification method includes:
a base station determining mapping relationships between cell and TA group; and
the base station sending the determined mapping relationships between cell and TA group to a UE.

An information notification apparatus includes:
a determining unit configured to determine mapping relationships between cell and TA group; and
a sending unit configured to transmit the determined mapping relationships between cell and TA group to a UE.

A base station includes the foregoing information notification apparatus.

In this solution, the base station sends the determined mapping relationships between cell and TA group to the UE after determining the mapping relationships between cell and TA group. Apparently with this solution, the UE can acquire the mapping relationships between cell and TA group.

Embodiments of the invention provide a TA acquisition method, a TA acquisition device, a UE and a communication system with carrier aggregation so as to address the problem of how a UE acquires a TA for uplink transmission in a cell newly added in a set of cells configured for the UE.

ATA acquisition method includes:
a UE receiving mapping relationships between cell and TA group sent from a base station; and
the UE determining a TA group corresponding to a newly added cell configured for the UE by the base station according to the mapping relationships; determining whether there is a cell, having established uplink synchronization with the based station, in the TA group; and if so, then regarding a TA of the cell as a TA for uplink transmission in the newly added cell; otherwise, then acquiring a TA for uplink transmission in the newly added cell by initiating a random access procedure; or
when received RRC signaling for configuring the UE with a newly added cell carries RACH configuration information of the newly added cell, the UE initiating a random access procedure according to the RACH configuration information to acquire a TA for uplink transmission in the newly added cell.

ATA acquisition device includes:
a receiving unit configured to receive mapping relationships between cell and TA group sent from a base station; and
an acquiring unit configured to determine a TA group corresponding to a newly added cell configured for the UE by the base station according to the mapping relationships; to determine whether there is a cell, having established uplink synchronization with the based station, in the TA group; and if so, to regard a TA of the cell as a TA for uplink transmission in the newly added cell; otherwise, to acquire a TA for uplink transmission in the newly added cell by initiating a random access procedure; or
when received RRC signaling for configuring the UE with a newly added cell carries RACH configuration information of the newly added cell, to initiate a random access procedure according to the RACH configuration information to acquire a TA for uplink transmission in the newly added cell.

A UE includes the foregoing TA acquisition apparatus.

A wireless communication system includes:
a base station configured to determine mapping relationships between cell and TA group and to send the determined mapping relationships between cell and TA group to a UE; and
the UE configured to receive the mapping relationships between cell and TA group sent from the base station; to determine a TA group corresponding to a newly added cell configured for the UE by the base station according to the mapping relationships; to determine whether there is a cell, having established uplink synchronization with the based station, in the TA group; and if so, to regard a TA of the cell as a TA for uplink transmission in the newly added cell; otherwise, to acquire a TA for uplink transmission in the newly added cell by initiating a random access procedure; or
when received RRC signaling for configuring the UE with a newly added cell carries RACH configuration information of the newly added cell, to initiate a random access procedure according to the RACH configuration information to acquire a TA for uplink transmission in the newly added cell.

In the inventive solutions, the UE receives the mapping relationships between cell and TA group sent from the base station, determines a TA group corresponding to a newly added cell configured for the UE by the base station according to the mapping relationships, determines whether there is a cell, having established uplink synchronization with the based station, in the TA group; and if so, then the UE regards a TA of the cell as a TA for uplink transmission in the newly added cell; otherwise, the UE acquires a TA for uplink transmission in the newly added cell by initiating a random access procedure; or when received RRC signaling for configuring the UE with a newly added cell carries Random Access Channel (RACH) configuration information of the newly added cell, the UE initiates a random access procedure according to the RACH configuration information to acquire a TA for uplink transmission in the newly added cell. Apparently with the invention, the UE can acquire a TA for uplink transmission in the newly added cell and further perform correct uplink transmission according to the TA to thereby avoid a data transmission error due to uplink out-of-synchronization.

DETAILED DESCRIPTION OF THE EMBODIMENTS

In order to enable a UE to acquire a TA for uplink transmission in a cell newly added in a set of cells configured for the UE, embodiments of the invention provide an information notification method and a TA acquisition method, and in the inventive method, a base station sends mapping relationships between cell and TA group to a UE, and the UE determines a TA for uplink transmission in a newly added cell according to the mapping relationships.

Figure 1:
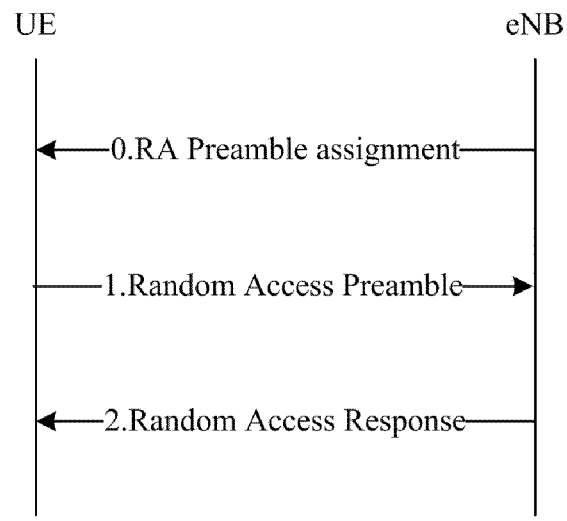
FIG. 1 is a schematic flow chart of a contention-free random access in the prior art.
Figure 2:
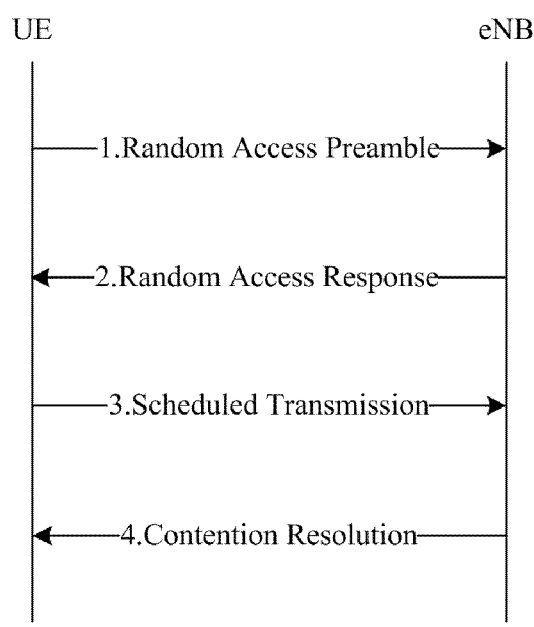
FIG. 2 is a schematic flow chart of a contention-based random access in the prior art.
Figure 3:
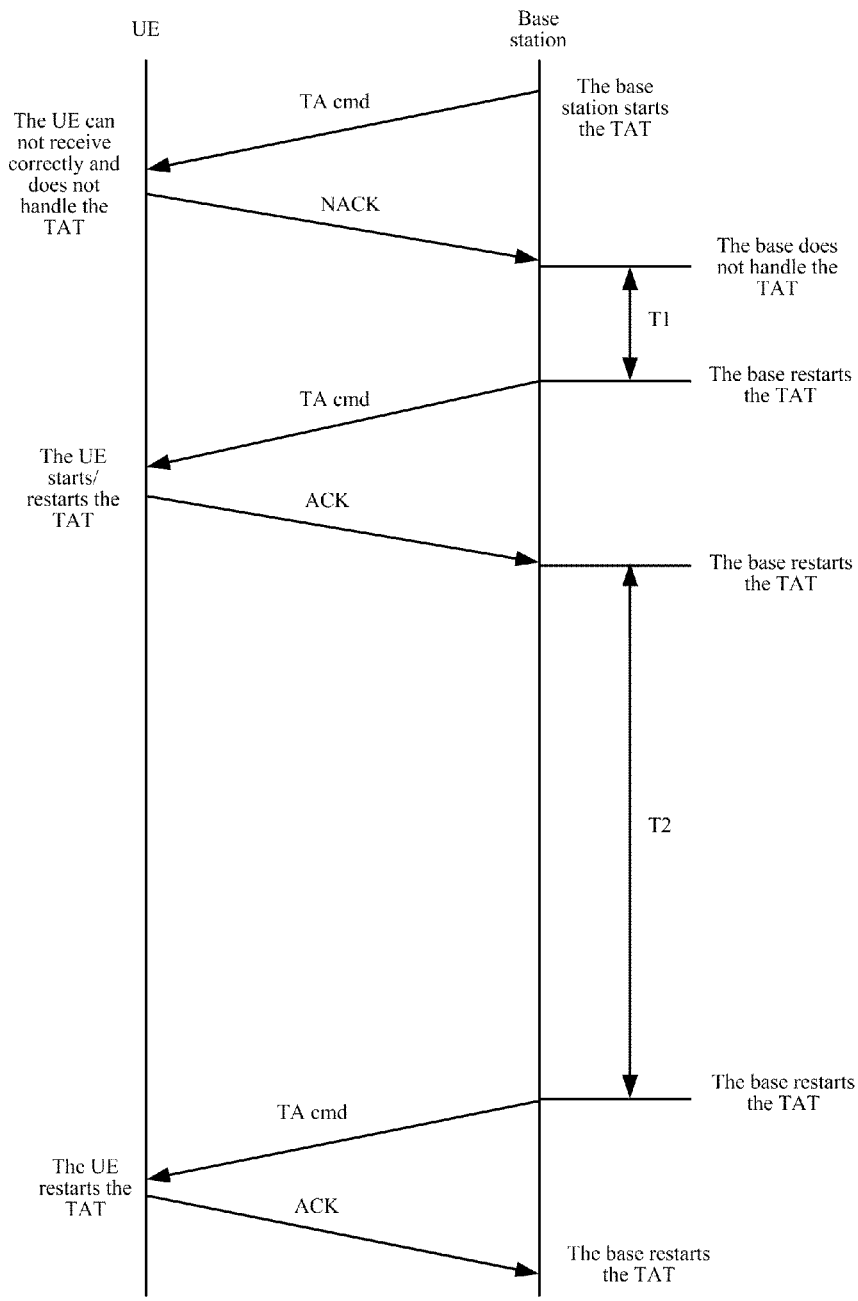
FIG. 3 is a schematic diagram of maintaining uplink synchronization in the prior art.
Figure 4:
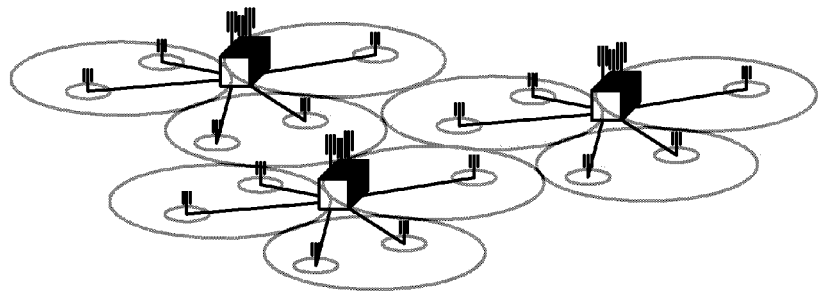
FIG. 4 is a schematic diagram of a scenario with an introduced RRH in the prior art.
Figure 5:
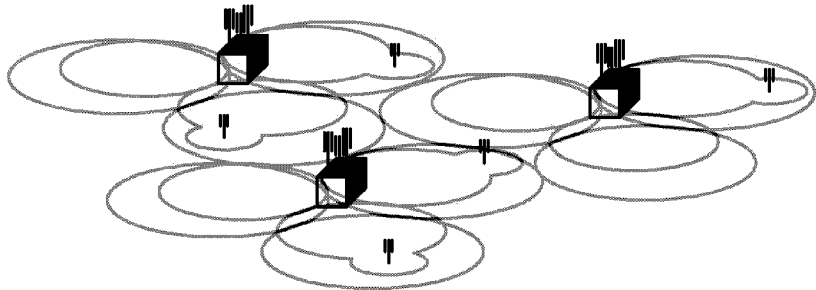
FIG. 5 is a schematic diagram of a scenario with an introduced repeater in the prior art.
Figure 6:
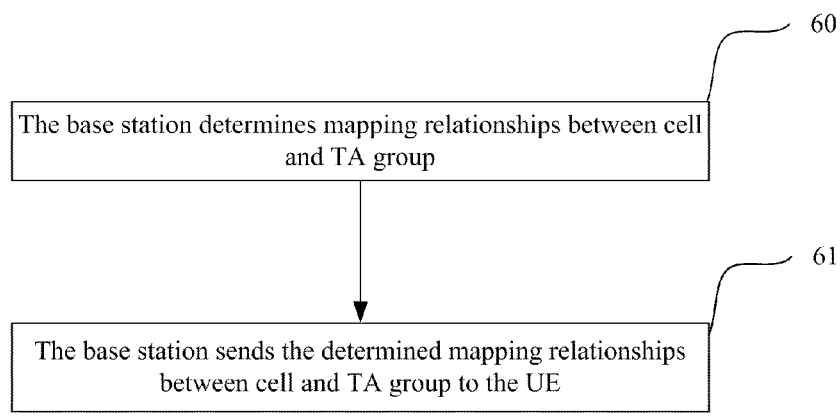
FIG. 6 is a schematic flow chart of a method according to an embodiment of the invention.

Referring to FIG. 6, an information notification method according to an embodiment of the invention includes the following steps:

Step 60: a base station determines mapping relationships between cell and TA group; and Step 61: the base station sends the determined mapping relationships between cell and TA group to a UE.

In an implementation, the base station determines the mapping relationships between cell and TA group in the step 60 particularly as follows: the base station determines mapping relationships between respective cells supported by the base station or aggregated by the UE and TA groups; and Correspondingly the base station sends the determined mapping relationships between cell and TA group to the UE in the step 61 particularly as follows: the base station sends to the UE the mapping relationships between the respective cells supported by the base station or aggregated by the UE and the TA groups by a system information.

In another implementation, the base station determines the mapping relationships between cell and TA group in the step 60 particularly as follows: the base station determines mapping relationships between respective cells supported by the base station or aggregated by the UE and TA groups; and Correspondingly the base station sends the determined mapping relationships between cell and TA group to the UE in the step 61 particularly as follows: the base station sends to the UE the mapping relationships between the respective cells supported by the base station or aggregated by the UE and the TA groups in Radio Resource Control (RRC) signaling after the UE establishes an RRC connection with the base station. The RRC signaling can be RRC reconfiguration signaling.

In the foregoing two implementations, after the base station sends the determined mapping relationships between cell and TA group to the UE, upon determining a cell to be newly added in a set of cells configured for the UE, the base station can send to the UE an RRC signaling for configuring the UE with the newly added cell, where the RRC signaling carries Random Access Channel (RACH) configuration information of the newly added cell. The RACH configuration information can include random access preamble information and PRACH resource information for an random access; or the RACH configuration information includes access preamble information, PRACH resource information for an random access and PRACH related physical layer resource configuration information in the newly added cell; or the RACH configuration information includes PRACH related physical layer resource configuration information in the newly added cell. Here the PRACH related physical layer resource configuration information includes a root sequence index and PRACH configuration information, and the PRACH configuration information includes a PRACH configuration index, a high speed flag, etc.

In a third implementation, the base station determines the mapping relationships between cell and TA group in the step 60 particularly as follows: the base station determines a mapping relationship between a first cell and a TA group after the UE establishes an RRC connection with the base station in the first cell; and Correspondingly the base station sends the determined mapping relationships between cell and TA group to the UE in the step 61 particularly as follows: the base station sends the mapping relationships between the first cell and the TA group to the UE by RRC signaling, where the RRC signaling can be RRC reconfiguration signaling.

The base station determining the mapping relationships between cell and TA group in the step 60 particularly further includes: upon determining a cell to be newly added in a set of cells configured for the UE, the base station determining a mapping relationship between the newly added cell and a TA group; and Correspondingly the base station sends the determined mapping relationships between cell and TA group to the UE in the step 61 particularly as follows: the base station sends to the UE RRC signaling for configuring the UE with the newly added cell, where the RRC signaling carries the mapping relationship between the newly added cell and the TA group.

In this implementation, the RRC signaling for configuring the UE with the newly added cell further carries RACH configuration information of the newly added cell. The RACH configuration information can include random access preamble information and PRACH resource information for an random access; or the RACH configuration information includes access preamble information, PRACH resource information for an random access and PRACH related physical layer resource configuration information in the newly added cell; or the RACH configuration information includes PRACH related physical layer resource configuration information in the newly added cell. Here the PRACH related physical layer resource configuration information includes a root sequence index and PRACH configuration information, and the PRACH configuration information includes a PRACH configuration index, a high speed flag, etc.

Figure 7:
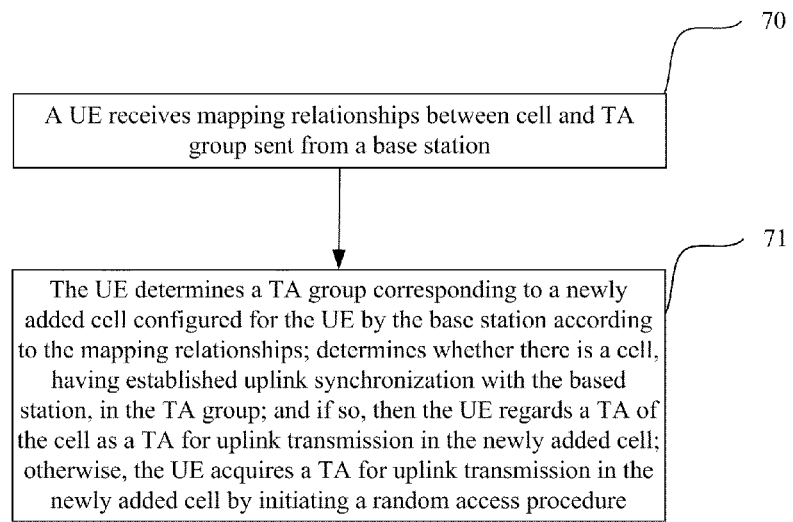
FIG. 7 is a schematic flow chart of another method according to an embodiment of the invention.

Referring to FIG. 7, an embodiment of the invention further provides a TA acquisition method including the following steps:

Step 70: a UE receives mapping relationships between cell and TA group sent from a base station; and Step 71: the UE determines a TA group corresponding to a newly added cell configured for the UE by the base station according to the mapping relationships; determines whether there is a cell, having established uplink synchronization with the based station, in the TA group; and if so, then the UE regards a TA of the cell as a TA for uplink transmission in the newly added cell; otherwise, the UE acquires a TA for uplink transmission in the newly added cell by initiating a random access procedure; or When received RRC signaling for configuring the UE with a newly added cell carries RACH configuration information of the newly added cell, the UE initiates a random access procedure according to the RACH configuration information to acquire a TA for uplink transmission in the newly added cell.

In an implementation, the UE receives the mapping relationships between cell and TA group sent from the base station in the step 70 particularly as follows: the UE receives mapping relationships between respective cells supported by the base station or aggregated by the UE and TA groups by a system information sent from the base station.

In another embodiment, the UE receives the mapping relationships between cell and TA group sent from the base station in the step 70 particularly as follows: the UE receives mapping relationships between respective cells supported by the base station or aggregated by the UE and TA groups by RRC signaling sent from the base station after establishing an RRC connection with the base station. The RRC signaling can include RRC reconfiguration signaling.

In a third embodiment, the UE receives the mapping relationships between cell and TA group sent from the base station in the step 70 particularly as follows:

The UE receives a mapping relationship between a first cell and a TA group in an RRC signaling sent from the base station after establishing an RRC connection with the base station in the first cell, where the RRC signaling can be RRC reconfiguration signaling; and the UE receives a mapping relationship between the newly added cell and the TA group by RRC signaling sent from the base station for configuring the UE with the newly added cell.

The base station can initiate the random access procedure according to the RACH configuration information in the step 71 particularly as follows:

The UE sends a random access preamble indicated by the RACH configuration information to the base station over a PRACH resource indicated by the RACH configuration information.

The invention will be described below in particular embodiments:

For different possible scenarios of uplink TAs of respective cells aggregated in a multi-carrier system, the invention proposes a TA group notification method using system information or dedicated signaling. An underlying idea thereof lies in carrying a cell and number information of a TA group to which it belongs in the system information or the dedicated signaling.

Particularly there are the following possible methods:

Method 1: mapping relationships between cells and TA groups are notified of in system information.

At the base station side:

Mapping relationships between respective cells supported by the system and TA groups are carried in a broadcast message.

At the UE side:

The UE acquires by reading the broadcast message and stores the relationships between the cells and the TA groups, and also the UE updates the stored mapping relationships with the updated broadcast message, and the UE can perform TA maintenance after the UE establishes an RRC connection with the base station.

Method 2: mapping relationships between respective cells and TA groups are notified of by RRC signaling all at once.

At the base station side:

After the UE establishes an RRC connection with the base station, the base station notifies the UE of mapping relationships between respective cells supported by the base station or respective cells which can be aggregated by the UE and TA groups by RRC signaling, and the UE will not be notified of any cell and TA group mapping relationship when the UE is reconfigured with a cell later.

At the UE side:

The UE stores the mapping relationships between the cells and the TA groups upon initial reception of configuration signaling including the mapping relationships, and if there is a newly added cell later, then the UE determines by itself to which TA group the cell belongs and then determines whether a UL cell in the TA group is in UL synchronization established with the base station, and if so, then the UE will not initiate any random access procedure; otherwise, the UE will initiate random access procedure.

Method 3: Each time a cell is newly added, a mapping relationship between the cell and a TA group is notified of by RRC signaling once.

At the base station side:

After the UE establishes an RRC connection with the base station, each time the base station newly adds a configured cell for the UE, the base station will notify of a TA group number corresponding to the newly added cell by RRC signaling.

At the UE side:

Each time a cell is newly added, the UE determines the TA group number corresponding to the cell according to the RRC signaling and compares the TA group number with the number of a TA group to which a previously uplink-synchronized UL cell belongs, and if a cell in uplink synchronization is in the TA group, then the UE can simply use a TA value of the TA group directly in the newly added cell without initiating any random access procedure; otherwise, the UE will initiate a random access procedure.

Furthermore for the foregoing three methods, if the RRC signaling of the cell newly added by the base station carries RACH configuration information (including an ra-PreambleIndex and an ra-PRACH-MaskIndex), then a random access procedure can simply be initiated directly according to the RACH configuration information.

First Embodiment

In this embodiment, the base station supports 4 cells which are numbered 1, 2, 3 and 4 respectively, and particularly:

Step 01: the base station determines from network planning that signals of the cell 1 and the cell 2 can be sent to the base station without passing any RRH/repeater and signals of the cell 3 and the cell 4 can be sent to the base station only after firstly passing an RRH or a repeater. Thus the base station can determine that the cell 1 and the cell 2 belong to the same TA group, denoted as a TA group 1, and the cell 3 and the cell 4 belong to another TA group, denoted as a TA group 2. The base station sends mapping relationships between the cell 1, the cell 2 and the TA group 1, and between the cell 3, the cell 4 and the TA group 2 to the UE in a broadcast message.

The mapping relationships can be carried in the broadcast message in the following two schemes:

Scheme 1:

| TA Group Identifier | Cell Identifier |
|---|---|
| 1 | Cell 1, Cell 2 |
| 2 | Cell 3, Cell 4 |

Scheme 2:

| Cell Identifier | TA Group Identifier |
|---|---|
| Cell 1 | 1 |
| Cell 2 | 1 |
| Cell 3 | 2 |
| Cell 4 | 2 |

Step 02: the UE acquires the mapping relationships between the respective cells and the TA groups by reading the broadcast message of the base station.

Numerous particular cell identifiers are possible as long as a cell can be identified uniquely throughout the base station, for example, a cell index, a PCI or the like.

Step 03: the UE establishes an RRC connection with the base station in the cell 1, and with traffic of the UE growing, it is necessary to configure the UE with CA transmission by newly adding cells which are the cell 2 and the cell 3, and then the UE can determine from the previously stored mapping relationships that the cell 2 belongs to the TA group 1 and the cell 3 belongs to the TA group 2, so a TA of the TA group 1 can be used for the cell 2, but there is no TA available to the cell 3, and a TA will be acquired by initiating a contention-based random access procedure.

When there is a change to the mapping relationships between the cells and the TA groups (for example, due to a replaced repeater or other reasons), the base station can update the broadcast message to ensure that the UE can acquire in a timely manner the latest mapping relationships between the cells and the TA groups all the time.

Second Embodiment

In this embodiment, the base station supports 4 cells which are numbered 1, 2, 3 and 4 respectively, and particularly:

Step 11: the base station determines from network planning that signals of the cell 1 and the cell 2 can be sent to the base station without passing any RRH/repeater and signals of the cell 3 and the cell 4 can be sent to the base station only after firstly passing an RRH or a repeater. Thus the base station can determine that the cell 1 and the cell 2 belong to the same TA group, denoted as a TA group 1, and the cell 3 and the cell 4 belong to another TA group, denoted as a TA group 2. The base station sends mapping relationships between the cell 1, the cell 2 and the TA group 1, and between the cell 3, the cell 4 and the TA group 2 to the UE in RRC reconfiguration signaling after the UE establishes an RRC connection with the base station in the cell 1; and The mapping relationships can be carried in the RRC reconfiguration signaling similarly to the scheme 1 and the scheme 2 in the broadcast message.

Step 12: the UE acquires and stores the mapping relationships between the respective cells and the TA groups by reading the RRC reconfiguration signaling.

Step 13: with traffic of the UE growing, it is necessary for the base station to configure the UE with CA transmission by newly adding cells which are the cell 2 and the cell 3, and the base station configures the UE with the newly added cell 2 and cell 3 by RRC signaling in which no TA group information is included.

Step 14: the UE receives the RRC signaling and determines from the previously stored mapping relationships between the cells and the TA groups that the cell 2 belongs to the TA group 1 and the cell 3 belongs to the TA group 2, so a TA of the TA group 1 can be used for the cell 2, but there is no TA available to the cell 3, and a TA will be acquired by initiating a contention-based random access procedure.

Third Embodiment

In this embodiment, the base station supports 4 cells which are numbered 1, 2, 3 and 4 respectively, and particularly:

Step 21: the base station determines from network planning that signals of the cell 1 and the cell 2 can be sent to the base station without passing any RRH/repeater and signals of the cell 3 and the cell 4 can be sent to the base station only after firstly passing an RRH or a repeater. Thus the base station can determine that the cell 1 and the cell 2 belong to the same TA group, denoted as a TA group 1, and the cell 3 and the cell 4 belong to another TA group, denoted as a TA group 2. The base station sends mapping relationships between the cell 1, the cell 2 and the TA group 1, and between the cell 3, the cell 4 and the TA group 2 to the UE in RRC reconfiguration signaling after the UE establishes an RRC connection with the base station in the cell 1; and The mapping relationships can be carried in the RRC reconfiguration signaling similarly to the scheme 1 and the scheme 2 in the broadcast message.

Step 22: the UE acquires and stores the mapping relationships between the respective cells and the TA groups by reading the RRC reconfiguration signaling.

Step 23: with traffic of the UE growing, it is necessary for the base station to configure the UE with CA transmission by newly adding cells which are the cell 2 and the cell 3, and the base station configures the UE with the newly added cell 2 and cell 3 by RRC signaling in which no TA group information is included but RACH configuration information (including an ra-PreambleIndex and an ra-PRACH-MaskIndex) in the cell 3 is included.

Step 24: the UE receives the RRC signaling and determines from the previously stored mapping relationships between the cells and the TA groups that the cell 2 belongs to the TA group 1, so a TA of the TA group 1 can be used for the cell 2, but for the cell 3, a TA in the TA group 2 will be acquired by initiating a contention-based random access procedure (with the value of the ra-PreambleIndex being 000000) or a contention-free random access procedure (with the value of the ra-PreambleIndex being other than 000000) as indicated by the base station.

Fourth Embodiment

In this embodiment, the base station supports 4 cells which are numbered 1, 2, 3 and 4 respectively, and particularly:

Step 31: the base station determines from network planning that signals of the cell 1 and the cell 2 can be sent to the base station without passing any RRH/repeater and signals of the cell 3 and the cell 4 can be sent to the base station only after firstly passing an RRH or a repeater. Thus the base station can determine that the cell 1 and the cell 2 belong to the same TA group, denoted as a TA group 1, and the cell 3 and the cell 4 belong to another TA group, denoted as a TA group 2. The base station sends a mapping relationship between the cell 1 and the TA group 1 to the UE in RRC reconfiguration signaling after the UE establishes an RRC connection with the base station in the cell 1;

Step 32: the UE acquires and stores the mapping relationship between the cell 1 and the TA group 1 by reading the RRC reconfiguration signaling.

Step 33: with traffic of the UE growing, it is necessary for the base station to configure the UE with CA transmission by newly adding cells which are the cell 2 and the cell 3, and the base station configures the UE with the newly added cell 2 and cell 3 by RRC signaling in which mapping relationships between the cell 2 and the TA group 1, and between the cell 3 and the TA group 2 are carried.

The mapping relationships can be carried particularly in the following scheme:

| Identifier of Cell To be Added | TA Group Identifier |
|---|---|
| Cell 2 | 1 |
| Cell 3 | 2 |

Step 34: the UE receives the RRC signaling and determines that the cell 2 belongs to the TA group 1 and thus can determine that the UE can use the same TA in the cell 2 as the cell 1, i.e., a TA value corresponding to the TA group 1; and there is no TA value currently available in the cell 3, so a TA value corresponding to the TA group 2 will be acquired by initiating a contention-based random access procedure in the cell 3.

Fifth Embodiment

In this embodiment, the base station supports 4 cells which are numbered 1, 2, 3 and 4 respectively, and particularly:

Step 41: the base station determines from network planning that signals of the cell 1 and the cell 2 can be sent to the base station without passing any RRH/repeater and signals of the cell 3 and the cell 4 can be sent to the base station only after firstly passing an RRH or a repeater. Thus the base station can determine that the cell 1 and the cell 2 belong to the same TA group, denoted as a TA group 1, and the cell 3 and the cell 4 belong to another TA group, denoted as a TA group 2. The base station sends a mapping relationship between the cell 1 and the TA group 1 to the UE in RRC reconfiguration signaling after the UE establishes an RRC connection with the base station in the cell 1;

Step 42: the UE acquires and stores the mapping relationship between the cell 1 and the TA group 1 by reading the RRC reconfiguration signaling.

Step 43: with traffic of the UE growing, it is necessary for the base station to configure the UE with CA transmission by newly adding cells which are the cell 2 and the cell 3, and the base station configures the UE with the newly added cell 2 and cell 3 by RRC signaling in which mapping relationships between the cell 2 and the TA group 1, mapping relationships between the cell 3 and the TA group 2, and contention-free RACH configuration information (including an ra-PreambleIndex and an ra-PRACH-MaskIndex) in the cell 3 are carried.

Step 44: the UE receives the RRC signaling and determines that the cell 2 belongs to the TA group 1 and thus can determine that the UE can use the same TA in the cell 2 as the cell 1, i.e., a TA value corresponding to the TA group 1; and will initiate a contention-based random access procedure (with the value of the ra-PreambleIndex being 000000) or a contention-free random access procedure (with the value of the ra-PreambleIndex being other than 000000) with the use of the RACH configuration information indicated by the base station to thereby acquire a TA value of the UE corresponding to the TA group 2.

Figure 8:
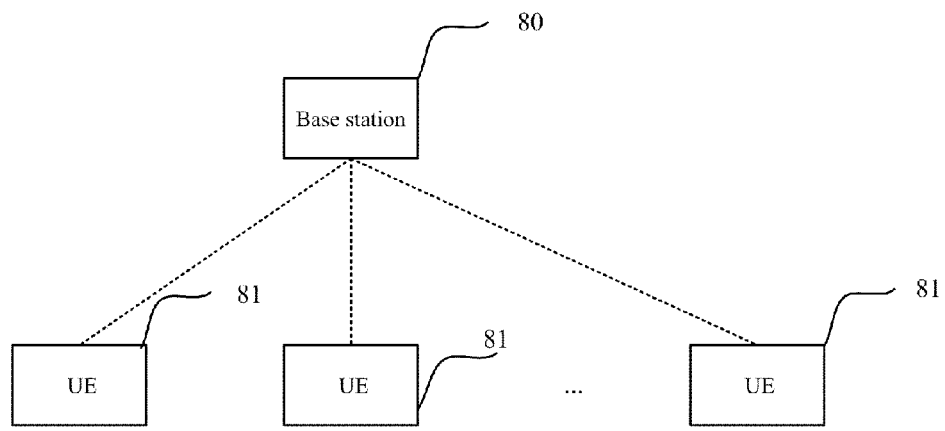
FIG. 8 is a schematic structural diagram of a system according to an embodiment of the invention.

Referring to FIG. 8, an embodiment of the invention further provides a wireless communication system including:

A base station 80 configured to determine mapping relationships between cell and TA group and to send the determined mapping relationships between cell and TA group to a UE; and The UE 81 configured to receive the cell and Timing Advance (TA) group mapping relationships sent from the base station; to determine a TA group corresponding to a newly added cell configured for the UE by the base station according to the mapping relationships; to determine whether there is a cell, having established uplink synchronization with the based station, in the TA group; and if so, to regard a TA of the cell as a TA for uplink transmission in the newly added cell; otherwise, to acquire a TA for uplink transmission in the newly added cell by initiating a random access procedure; or When received Radio Resource Control (RRC) signaling to configure the UE with a newly added cell carries Random Access Channel (RACH) configuration information of the newly added cell, to initiate a random access procedure according to the RACH configuration information to acquire a TA for uplink transmission in the newly added cell.

Figure 9:
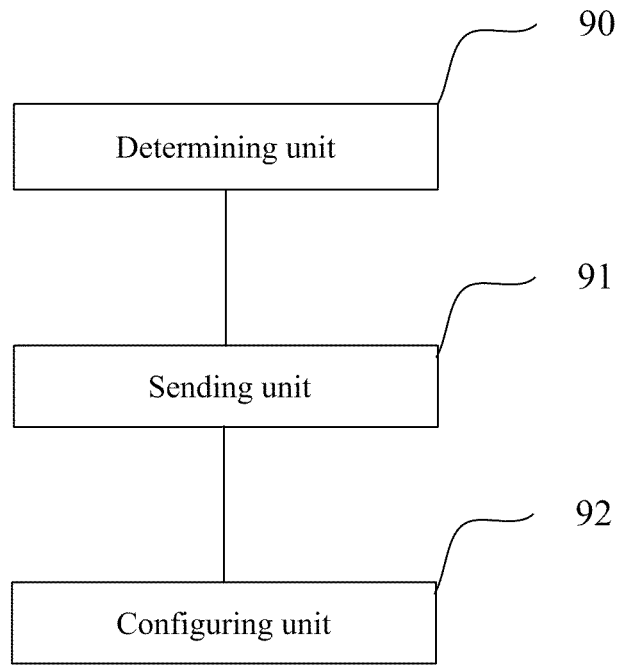
FIG. 9 is a schematic structural diagram of a device according to an embodiment of the invention.

Referring to FIG. 9, an embodiment of the invention further provides a TA group information notification device including:

A determining unit 90 configured to determine mapping relationships between cell and TA group; and A sending unit 91 configured to transmit the determined mapping relationships between cell and TA group to a UE.

The determining unit 90 is configured:

To determine mapping relationships between respective cells supported by a base station or aggregated by the UE and TA groups; and The sending unit 91 is configured:

To send the mapping relationships between the respective cells supported by the base station or aggregated by the UE and the TA groups to the UE by a system information.

The determining unit 90 is configured:

To determine mapping relationships between respective cells supported by a base station or aggregated by the UE and TA groups; and The sending unit 91 is configured:

To send the mapping relationships between the respective cells supported by the base station or aggregated by the UE and the TA groups to the UE in Radio Resource Control (RRC) signaling after the UE establishes an RRC connection with the base station.

The device further includes:

A configuring unit 92 configured, after sending the determined mapping relationships between cell and TA group to the UE, upon determining a cell to be newly added in a set of cells configured for the UE, to send to the UE RRC signaling for configuring the UE with the newly added cell, where the RRC signaling carries Random Access Channel (RACH) configuration information of the newly added cell.

The determining unit 90 is configured:

To determine a mapping relationship between a first cell and a TA group after the UE establishes an RRC connection with the base station in the first cell, and The sending unit 91 is configured:

To send the mapping relationship between the first cell and the TA group to the UE by
RRC signaling; and The determining unit 90 is further configured:

Upon determining a cell to be newly added in a set of cells configured for the UE, to determine a mapping relationship between the newly added cell and a TA group, and The sending unit 91 is further configured:

To send to the UE RRC signaling for configuring the UE with the newly added cell, where the RRC signaling carries the mapping relationship between the newly added cell and the TA group.

The RRC signaling further carries RACH configuration information of the newly added cell.

The RACH configuration information includes:

Random access preamble information and Physical Random Access Channel (PRACH) resource information for an random access; and/or PRACH related physical layer resource configuration information in the newly added cell.

Figure 10:
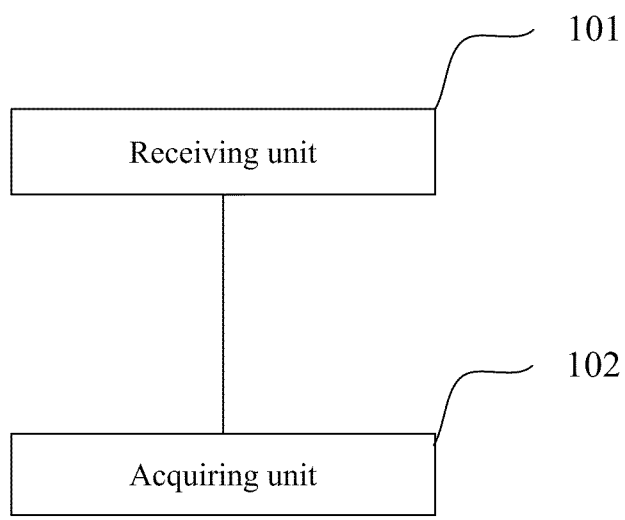
FIG. 10 is a schematic structural diagram of another device according to an embodiment of the invention.

Referring to FIG. 10, an embodiment of the invention further provides a TA acquisition device including:

A receiving unit 101 configured to receive cell and Timing Advance (TA) group mapping relationships sent from a base station; and An acquiring unit 102 configured to determine a TA group corresponding to a newly added cell configured for the UE by the base station according to the mapping relationships; to determine whether there is a cell, having established uplink synchronization with the based station, in the TA group; and if so, to regard a TA of the cell as a TA for uplink transmission in the newly added cell; otherwise, to acquire a TA for uplink transmission in the newly added cell by initiating a random access procedure; or When received Radio Resource Control (RRC) signaling to configure the UE with a newly added cell carries Random Access Channel (RACH) configuration information of the newly added cell, to initiate a random access procedure according to the RACH configuration information to acquire a TA for uplink transmission in the newly added cell.

The receiving unit 101 is configured:

To receive mapping relationships and respective cells supported by the base stations or aggregated by the UE and TA groups by a system information sent from the base station.

The receiving unit 101 is configured:

To receive mapping relationships between respective cells supported by the base stations or aggregated by the UE and TA groups by RRC signaling sent from the base station after establishing an RRC connection with the base station.

The receiving unit 101 is configured:

To receive a mapping relationship between a first cell and a TA group by RRC signaling sent from the base station after establishing an RRC connection with the base station in the first cell; and To receive a mapping relationship between a newly added cell and a TA group by RRC signaling sent from the base station for configuring the UE with the newly added cell.

The acquiring unit 102 is configured:

To send a random access preamble indicated by the RACH configuration information to the base station over a PRACH resource indicated by the RACH configuration information.

An embodiment of the invention further provides a base station including the foregoing information notification device.

An embodiment of the invention further provides a UE including the foregoing TA acquisition device.

In summary, advantageous effects of the invention include:

In the solutions according to the embodiments of the invention, the base station determines cell and Timing Advance (TA) group mapping relationships and sends the determined cell and Timing Advance (TA) group mapping relationships to the UE; and the UE receives and stores the mapping relationships, determines a TA group corresponding to a newly added cell configured for the UE by the base station according to the mapping relationships, determines whether there is a cell, having established uplink synchronization with the based station, in the TA group; and if so, then the UE regards a TA of the cell as a TA for uplink transmission in the newly added cell; otherwise, the UE acquires a TA for uplink transmission in the newly added cell by initiating a random access procedure; or when received RRC signaling for configuring the UE with a newly added cell carries RACH configuration information of the newly added cell, the UE initiates a random access procedure according to the RACH configuration information to acquire a TA for uplink transmission in the newly added cell. Apparently with the invention, the UE can determine a TA for uplink transmission in the newly added cell and further perform correct uplink transmission according to the TA to thereby avoid a data transmission error due to uplink out-of-synchronization.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. An information notification method, comprising:
a base station determining mapping relationships between cell and Timing Advance, TA, group; and
the base station sending the determined mapping relationships between cell and TA group to a User Equipment, UE, by a system information or RRC signaling;
wherein after the base station sends the determined mapping relationships between cell and TA group to the UE, the method further comprises:
upon determining a cell to be newly added in a set of cells configured for the UE, the base station sending to the UE RRC signaling for configuring the UE with the newly added cell, so that the UE can determine a TA group corresponding to a newly added cell configured for the UE by the base station according to the mapping relationships, determine whether there is a cell, having established uplink synchronization with the based station, in the TA group, and if so, then regard a TA of the cell as a TA for uplink transmission in the newly added cell.

2. The method according to claim 1, wherein the base station determining the mapping relationships between cell and TA group comprises:
the base station determining mapping relationships between respective cells, supported by the base station or aggregated by the UE, and TA groups.

3. The method according to claim 2, wherein after the base station sends the determined mapping relationships between cell and TA group to the UE, the method further comprises:
wherein the RRC signaling configuring the UE with the newly added cell carries Random Access Channel, RACH, configuration information of the newly added cell.

4. The method according to claim 3, wherein the RACH configuration information comprises:
random access preamble information and Physical Random Access Channel, PRACH, resource information for an random access; and/or
PRACH related physical layer resource configuration information in the newly added cell.

5. The method according to claim 1, wherein the base station determining the mapping relationships between cell and TA group and the base station sending the determined mapping relationships between cell and TA group to the UE comprises:
the base station determining a mapping relationship between a first cell and a TA group and sending the mapping relationship between the first cell and the TA group to the UE by RRC signaling, wherein the first cell is a cell in which the UE establishes an RRC connection with the base station; and
upon determining a cell to be newly added in a set of cells configured for the UE, the base station determining a mapping relationship between the newly added cell and a TA group and sending to the UE an RRC signaling for configuring the UE with the newly added cell, wherein the RRC signaling for configuring the UE with the newly added cell carries the mapping relationship between the newly added cell and the TA group.

6. The method according to claim 5, wherein the RRC signaling for configuring the UE with the newly added cell further carries RACH configuration information of the newly added cell.

7. A Timing Advance, TA, acquisition method, comprising:
a UE receiving mapping relationships between cell and Timing Advance, TA, group sent from a base station; and
the UE determining a TA group corresponding to a newly added cell configured for the UE by the base station according to the mapping relationships; determining whether there is a cell, having established uplink synchronization with the based station, in the TA group; and if so, then regarding a TA of the cell as a TA for uplink transmission in the newly added cell; otherwise, then acquiring a TA for uplink transmission in the newly added cell by initiating a random access procedure; or
when received Radio Resource Control, RRC, signaling for configuring the UE with a newly added cell carries Random Access Channel, RACH, configuration information of the newly added cell, the UE initiating a random access procedure according to the RACH configuration information to acquire a TA for uplink transmission in the newly added cell.

8. The method according to claim 7, wherein the UE receiving the mapping relationships between cell and TA group sent from the base station comprises:
the UE receiving mapping relationships between respective cells, supported by the base stations or aggregated by the UE, and TA groups by a system information or RRC signaling sent from the base station.

9. The method according to claim 7, wherein the UE receiving the mapping relationships between cell and TA group sent from the base station comprises:
the UE receiving a mapping relationship between a first cell and a TA group by RRC signaling sent from the base station, wherein the first cell is a cell in which the UE establishes an RRC connection with the base station; and
the UE receiving a mapping relationship between a newly added cell and a TA group by RRC signaling sent from the base station for configuring the UE with the newly added cell.

10. The method according to claim 7, wherein the initiating the random access procedure according to the RACH configuration information comprises:
the UE sending to the base station a random access preamble indicated by the RACH configuration information over a PRACH resource indicated by the RACH configuration information.

11. An information notification device, comprising:
a determining unit configured to determine mapping relationships between cell and TA group; and
a sending unit configured to transmit the determined mapping relationships between cell and TA group to a UE, by a system information or RRC signaling;
a configuring unit configured, after sending the determined mapping relationships between cell and TA group to the UE, upon determining a cell to be newly added in a set of cells configured for the UE, to send to the UE an RRC signaling for configuring the UE with the newly added cell, so that the UE can determine a TA group corresponding to a newly added cell configured for the UE by the base station according to the mapping relationships, determine whether there is a cell, having established uplink synchronization with the based station, in the TA group, and if so, then regard a TA of the cell as a TA for uplink transmission in the newly added cell.

12. The device according to claim 11, wherein the determining unit is configured:
to determine mapping relationships between respective cells, supported by a base station or aggregated by the UE, and TA groups.

13. The device according to claim 12, wherein the RRC signaling for configuring the UE with the newly added cell carries Random Access Channel, RACH, configuration information of the newly added cell.

14. The device according to claim 13, wherein the RACH configuration information comprises:
random access preamble information and Physical Random Access Channel, PRACH, resource information for an random access; and/or
PRACH related physical layer resource configuration information in the newly added cell.

15. The device according to claim 11, wherein the determining unit is configured:
to determine a mapping relationship between a first cell and a TA group, wherein the first cell is a cell in which the UE establishes an RRC connection with a base station, and
the sending unit is configured:
to send the mapping relationship between the first cell and the TA group to the UE by RRC signaling; and
the determining unit is further configured:
upon determining a cell to be newly added in a set of cells configured for the UE, to determine a mapping relationship between the newly added cell and a TA group, and
the sending unit is further configured:
to send to the UE an RRC signaling for configuring the UE with the newly added cell, wherein the RRC signaling for configuring the UE with the newly added cell carries the mapping relationship between the newly added cell and the TA group.

16. The device according to claim 15, wherein the RRC signaling configuring the UE with the newly added cell further carries RACH configuration information of the newly added cell.

17. A Timing Advance, TA, acquisition device, comprising:
a receiving unit configured to receive mapping relationships between cell and Timing Advance, TA, group sent from a base station; and
an acquiring unit configured to determine a TA group corresponding to a newly added cell configured for the UE by the base station according to the mapping relationships; to determine whether there is a cell, having established uplink synchronization with the based station, in the TA group; and if so, to regard a TA of the cell as a TA for uplink transmission in the newly added cell; otherwise, to acquire a TA for uplink transmission in the newly added cell by initiating a random access procedure; or
when received Radio Resource Control, RRC, signaling for configuring the UE with a newly added cell carries Random Access Channel, RACH, configuration information of the newly added cell, to initiate a random access procedure according to the RACH configuration information to acquire a TA for uplink transmission in the newly added cell.

18. The device according to claim 17, wherein the receiving unit is configured:
to receive mapping relationships between respective cells, supported by the base stations or aggregated by the UE, and TA groups by a system information or RRC signaling sent from the base station.

19. The device according to claim 17, wherein the receiving unit is configured:
to receive a mapping relationship between a first cell and a TA group by RRC signaling sent from the base station, wherein the first cell is a cell in which the UE establishes an RRC connection with the base station; and
to receive a mapping relationship between a newly added cell and a TA group by RRC signaling sent from the base station for configuring the UE with the newly added cell.

20. The device according to claim 17, wherein the acquiring unit is configured:
to send to the base station a random access preamble indicated by the RACH configuration information over a PRACH resource indicated by the RACH configuration information.

* * * * *